United States Patent
Jackson et al.

(10) Patent No.: US 9,722,716 B2
(45) Date of Patent: Aug. 1, 2017

(54) ROTARY CONTROL DEVICE

(71) Applicant: Red Lion 49 Limited, Oxfordshire (GB)

(72) Inventors: David Jackson, Oxfordshire (GB); Enrique Perez Gonzalez, Oxfordshire (GB)

(73) Assignee: Red Lion 49 Limited, Begbroke, Oxford (GB)

( * ) Notice: Subject to any disclaimer, the term of this patent is extended or adjusted under 35 U.S.C. 154(b) by 241 days.

(21) Appl. No.: 14/643,437

(22) Filed: Mar. 10, 2015

(65) Prior Publication Data

US 2015/0262769 A1    Sep. 17, 2015

(30) Foreign Application Priority Data

Mar. 14, 2014 (GB) .................................. 1404725.2

(51) Int. Cl.
| | | |
|---|---|---|
| *H01H 13/02* | (2006.01) | |
| *H04H 60/04* | (2008.01) | |
| *G05G 1/10* | (2006.01) | |
| *G06F 3/041* | (2006.01) | |
| *H01H 19/02* | (2006.01) | |
| *H01H 3/00* | (2006.01) | |
| *H01H 3/02* | (2006.01) | |

(52) U.S. Cl.
CPC ............. *H04H 60/04* (2013.01); *G05G 1/105* (2013.01); *G06F 3/041* (2013.01); *H01H 19/025* (2013.01); *H01H 2003/008* (2013.01); *H01H 2003/0293* (2013.01); *H01H 2219/062* (2013.01); *H01H 2239/006* (2013.01)

(58) Field of Classification Search
CPC ........ H04H 60/04; H01H 13/02; G05G 1/105; G06F 3/041
USPC ........................................................ 200/316
See application file for complete search history.

(56) References Cited

U.S. PATENT DOCUMENTS

| | | |
|---|---|---|
| 5,450,075 A | 9/1995 | Waddington |
| 7,060,916 B1 * | 6/2006 | Amit ...................... H01H 19/14 200/11 R |
| 2012/0175231 A1 * | 7/2012 | Chung ................. H01H 19/005 200/316 |

FOREIGN PATENT DOCUMENTS

| | | | | |
|---|---|---|---|---|
| DE | 10127211 A1 | | 1/2003 | |
| EP | 1610207 A2 | * | 6/2005 | ............... G06F 3/00 |
| EP | 2500922 A1 | * | 2/2012 | ............... H01H 9/02 |
| JP | 2003-151410 A | | 5/2003 | |
| WO | 2005/026664 A1 | | 3/2005 | |
| WO | WO 2005/026664 | * | 3/2005 | ............. G01D 5/347 |

* cited by examiner

*Primary Examiner* — Edwin A. Leon
*Assistant Examiner* — Iman Malakooti
(74) *Attorney, Agent, or Firm* — Richard M. Goldberg (57) ABSTRACT

A touch-sensitive rotary control device with an illumination function includes a rotary encoder having a conductive outer casing and a rotatable shaft extending from it, the shaft operating as a light guide for a light source located in the rotary encoder, a conductive sleeve mechanically coupled to and surrounding the side of shaft, and electrically coupled to the conductive outer casing of the rotary encoder, so that touch-sensitivity is provided and light is allowed to exit the shaft and such that the device can be provided as a kit of parts or form part of a mixing console.

23 Claims, 5 Drawing Sheets

ROTARY CONTROL DEVICE

CROSS REFERENCE TO RELATED APPLICATIONS

This application claims priority from United Kingdom patent application number 14 04 725.2 filed Mar. 14, 2014, the whole contents of which are incorporated herein by reference in their entirety.

BACKGROUND OF THE INVENTION

1. Field of the Invention

The present invention relates to control devices, and in particular those that are illuminable in combination with being able to sense both touch and rotary motion.

2. Description of the Related Art

Modern mixing consoles tend to include digital control of various parameters. This can in part be due to the actual parameters being controlled being those of digital devices, or as part of a general market trend towards the use of digital circuit elements to provide power savings, cost savings and reduction in complexity, etc.

One major advantage of digital control elements such as sliders, knobs and buttons in mixing consoles is that it is much easier to assign different functions to the control elements than with analogue controls. This tends to be because the digital control elements are all connected to a bus under the control of a common microcontroller. The assigned function tends to be indicated by the appearance of the control or some type of indicator near it. Color is often used, with mixing consoles manufactured by the present applicant having different color controls in the equalizer sections for different frequency bands.

A fundamental building block of rotary controls in mixing consoles, typically used for controlling equalizers, etc. that have digital control is the rotary encoder. These are electro-mechanical devices which convert the angular position or motion of a shaft into an electrical code. Absolute encoders indicate the current position of the shaft, whilst incremental encoders provide information about the motion of the shaft. The position and speed of the shaft can then be derived. Some rotary controls are touch sensitive, so that for example automated processes, for example attenuation applied to a particular frequency band in an equalizer, can be interrupted to give way to manual control.

A problem encountered is the combination of maintaining touch sensitivity and providing the capability of the control to change appearance to indicate an assigned function for example, whilst also providing other features to allow the rotary control to be configurable for controlling a multiplicity of different kinds of parameters.

BRIEF SUMMARY OF THE INVENTION

According to an aspect of the present invention, there is provided a touch-sensitive rotary control device with an illumination function, the control device comprising: a rotary encoder having a conductive outer casing and a rotatable shaft extending therefrom defining an axis of rotation, which shaft is configured to operate as a light guide for a light source located in the rotary encoder; and a conductive sleeve mechanically coupled to and arranged to surround the side of the shaft, and electrically coupled to the conductive outer casing of the rotary encoder, to provide touch-sensitivity whilst allowing light to exit the shaft.

In this way, touch sensitivity can be maintained whilst providing for illumination of the rotary control device.

According to another aspect of the present invention, there is provided a kit of parts for assembling a touch-sensitive rotary control device with an illumination function, comprising: a rotary encoder having a conductive outer casing and a rotatable shaft extending therefrom defining an axis of rotation, which shaft is configured to operate as a light guide for a light source located in the rotary encoder; a conductive sleeve arranged to mechanically couple to and arranged to surround the side of the shaft, and electrically couple to the conductive outer casing of the rotary encoder, to provide touch-sensitivity whilst allowing light to exit the shaft.

According to a further aspect of the present invention, there is provided a mixing console having a control surface including at least one touch-sensitive rotary control device with an illumination function mounted thereon to which control of a plurality of functions can be assigned, the control device comprising: a rotary encoder having a conductive outer casing positioned behind the control surface, and a rotatable shaft extending from it through an opening in the control surface and defining an axis of rotation, which shaft is configured to operate as a light guide for a light source located in the rotary encoder; a conductive sleeve mechanically coupled to and arranged to surround the side of the shaft, and electrically coupled to the conductive outer casing of the rotary encoder, to provide touch-sensitivity whilst allowing light to exit the shaft.

DETAILED DESCRIPTION OF EXAMPLE EMBODIMENTS

The following embodiment of the rotary control device of the present invention is described as forming part of a mixing console, but it will of course be appreciated by those skilled in the art that the principles employed by the present invention have applicability in other fields, such as in-car control systems for example, or indeed any other application in which rotary control is required.

Figure 1:
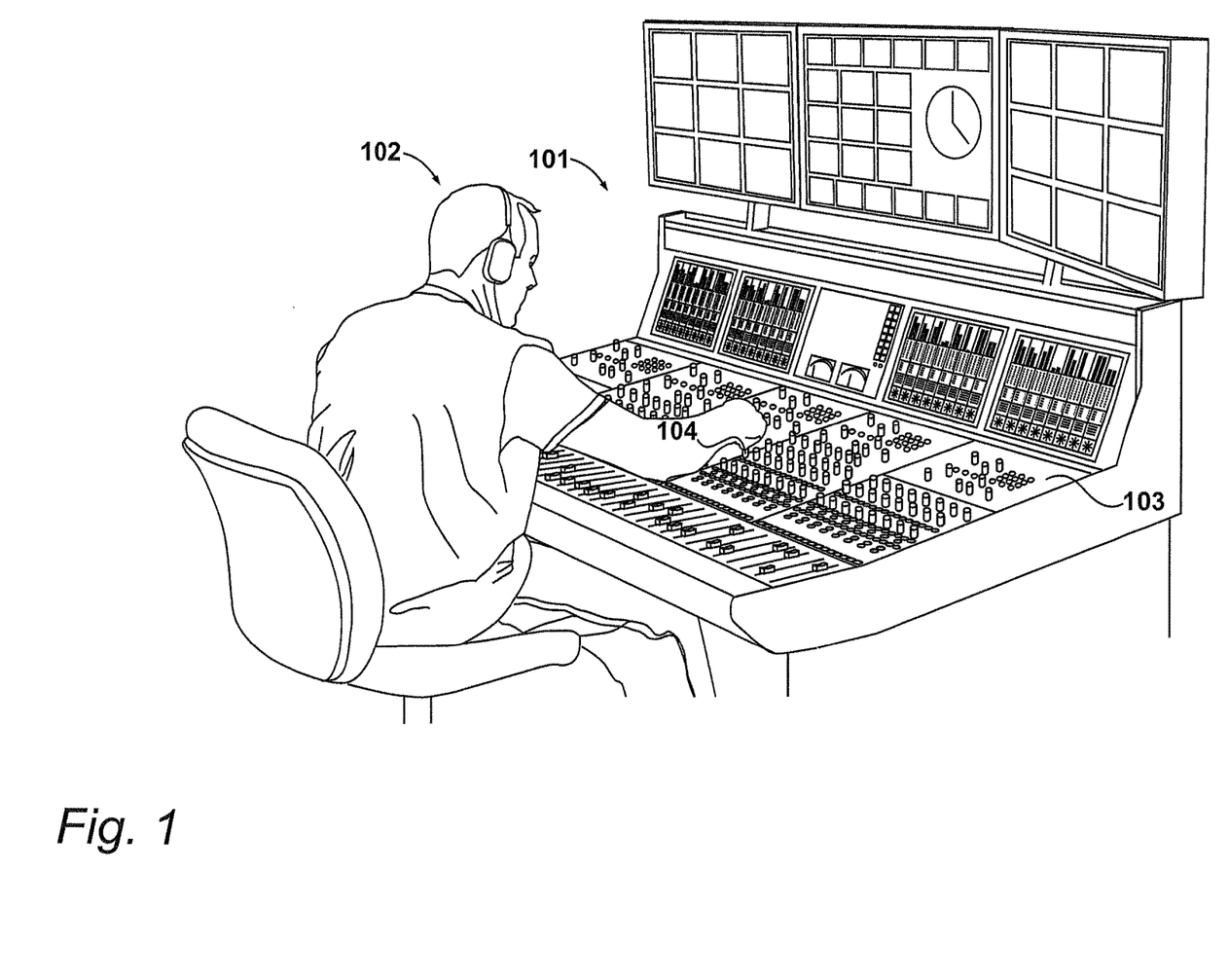
FIG. 1 is an illustration of a mixing console including the rotary control of the present invention.

FIG. 1

An example of an environment in which the present invention can be used is shown in FIG. 1. A mixing console 101 is, in this environment, being employed to mix numerous channels of audio from many disparate signal sources into one output in a live broadcast system. An operator 102 is responsible for controlling the relative contribution of each audio source into the final mix prior to it being combined with a video signal for eventual broadcast, and for controlling processing of the audio channels such as equalization, limiting and gating, etc. Of course, it will be appreciated by those skilled in the art that the use of mixing consoles like mixing console 101 is not exclusive to broadcast environments, with them also being employed in recording studios, public address systems and film post-production environments.

Mixing console 101 has a control surface 103 upon which are mounted a large number of controls. As shown in the Figure, the operator 102 is controlling a parameter by rotating a rotary control 104, which embodies the present invention.

Figure 2A:
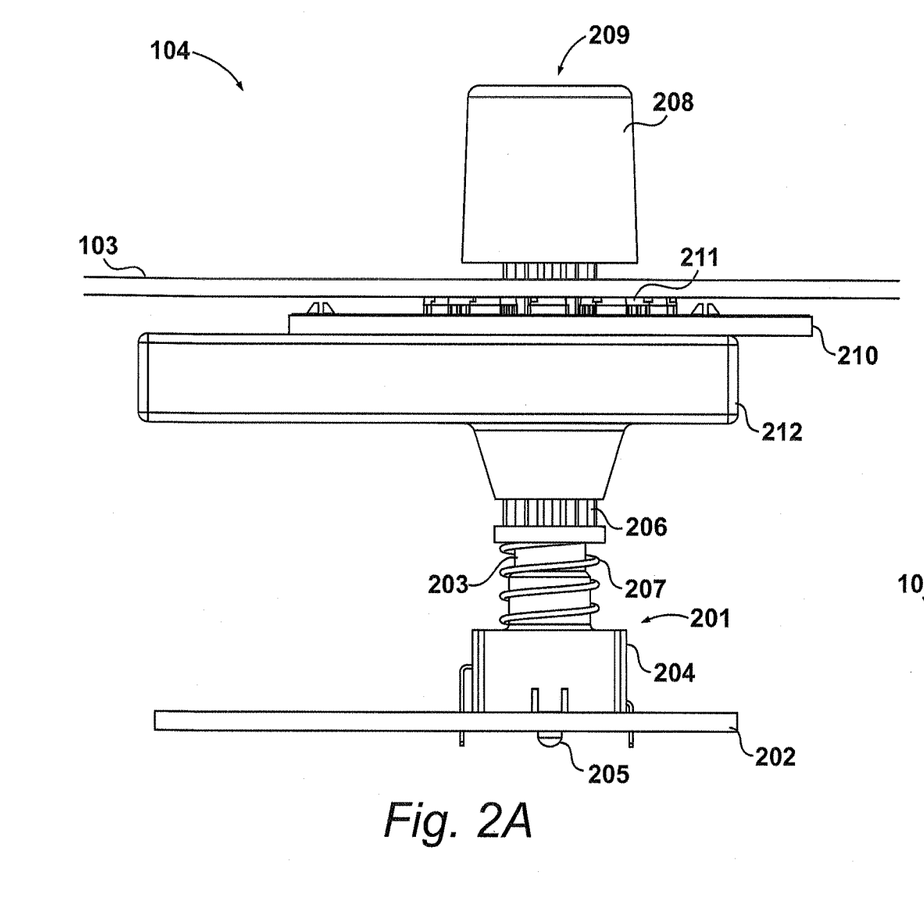
FIG. 2A is a side-on view of the rotary control identified in FIG. 1.
Figure 2B:
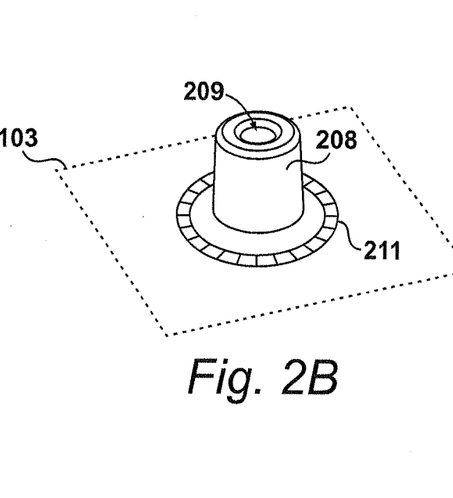
FIG. 2B is a perspective view of the rotary control installed on a control surface.

FIGS. 2A & 2B

Rotary control 104 is shown in side-on view in FIG. 2A, and in isometric view in FIG. 2B.

Rotary control 104 is mounted in the control surface 103 of mixing console 101. Rotary control 104 includes a rotary encoder 201 mounted in a lower printed circuit board (PCB) 202. The rotary encoder 201 has a rotatable shaft 203 extending from it, which, when rotated, causes rotary encoder 201 to output a signal representing the motion of the shaft. In the present embodiment, the rotary encoder 201 is an incremental rotary encoder, and so the output signal provides information about the motion of the shaft. Alternatively, the rotary encoder 201 could be an absolute encoder, which would output a signal identifying the current position of the rotatable shaft 203.

Figure 5:
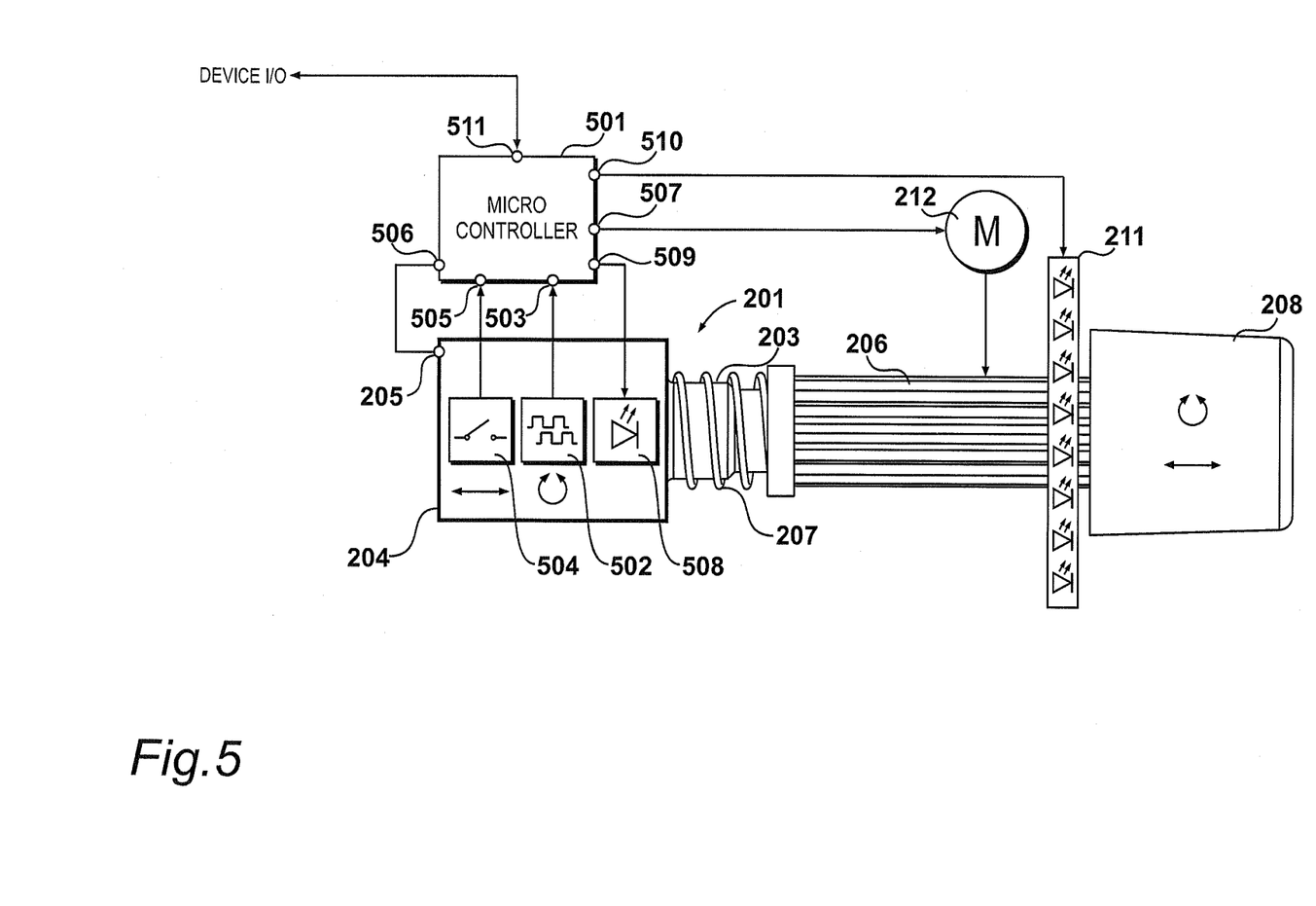
FIG. 5 is a functional block diagram of the rotary control when connected to and under the control of a microcontroller.

Rotatable shaft 203 is configured to act as a light guide for a light source within the rotary encoder 201, which is identified and described further with reference to FIG. 5. In this embodiment, the rotatable shaft 203 is made from a substantially transparent plastics material, such as Perspex®. Rotary encoder 201 has a conductive outer casing 204, which is connected to the lower PCB 202 by a pin 205. When fitted in the mixing console 101, the rotary encoder 201 is arranged to be mounted beneath control surface 103, with the rotatable shaft 203 extending through an opening in the control surface to the upper side.

A conductive sleeve 206 is mechanically coupled to rotatable shaft 203 and arranged to surround it, so as to transmit torque. In the present embodiment, conductive sleeve 206 is glued to rotatable shaft 203, but as an alternative, an interference or a push fit can be used. The conductive sleeve 206 is arranged to be electrically coupled to the outer casing 204 of rotary encoder 201.

In this way, when an operator grips the rotary control 104, a circuit is created between ground and pin 205, allowing touch sensing. Alternatively, capacitive sensing can be utilized. By providing the conductive sleeve 206 around the rotatable shaft 203, light may still exit the rotary encoder 201, which allows the illumination of the rotary control.

In a specific embodiment, electrical coupling of the conductive sleeve 206 to the outer casing 204 of rotary encoder 201 is achieved by a conductive spring 207 positioned between the sleeve and the outer casing. The provision of conductive spring 207 allows rotation of the sleeve and thereby the shaft without loss of conduction. Furthermore, in this embodiment, the rotary encoder 201 includes a push switch function, activated by movement of the rotatable shaft 203 in a direction parallel to its axis of rotation. This allows an additional binary parameter to be outputted by rotary encoder 201 in addition to angular position sensing. The switch is in an example a momentary switch (described further with reference to FIG. 5) such that the rotatable shaft 203 returns to a default position after activation. By providing conductive spring 207, electrical coupling between the conductive sleeve 206 to the outer casing 204 of rotary encoder 201 is always maintained.

In a specific embodiment, the rotary control 104 includes a conductive grip member in the form of a conductive knob 208 to provide more ergonomic control. Conductive knob 208 is mechanically coupled to conductive sleeve 206 by an interference fit. Conductive knob 208 also has an opening 209 therein forming a through hole into which the rotatable shaft 203 is arranged to extend, allowing the light guide function to operate and light to exit the rotary control. Conductive knob 208 is in this embodiment composed of carbon-filled nylon, but could of course be manufactured from any other conductive material.

An upper PCB 210 is arranged to be located directly beneath the control surface 103, and has mounted thereon, between it and the control surface 103, an annular lighting array 211. The annular lighting array 211 is viewable through a series of openings in the control surface 103, and is described further with reference to FIG. 5.

Figure 4:
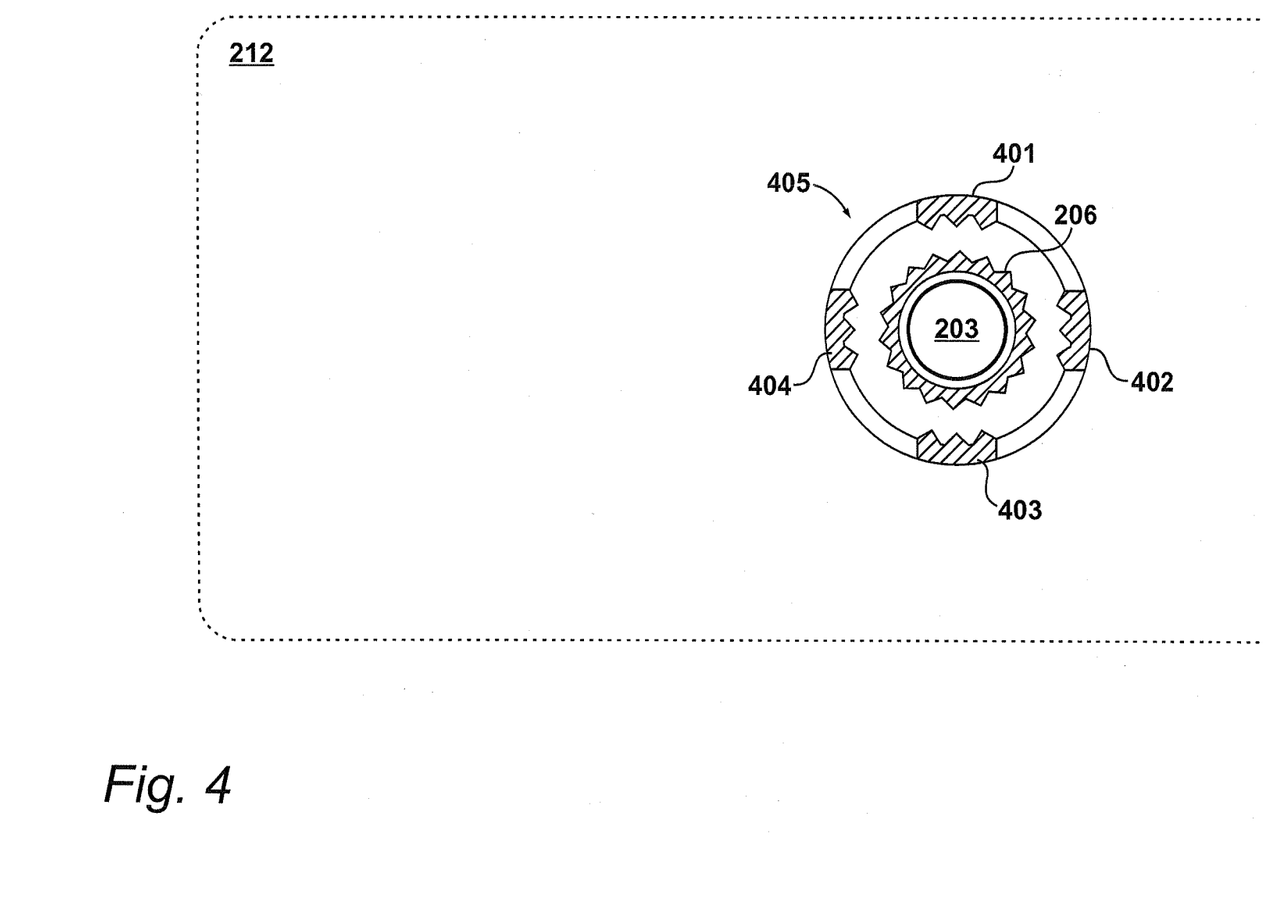
FIG. 4 is a cross-sectional view of the motor forming part of the rotary control.

In a specific embodiment, the upper PCB 210 is a double-sided PCB, and thus mounted on the opposite side to annular light array 211 is a motor 212. Motor 212 is coupled to conductive sleeve 206, and, as will be described further with reference to FIG. 4, is arranged to apply torque to the conductive sleeve 206, for example to allow the provision of haptic feedback to a user by applying varying degrees of negative torque. In a specific embodiment, the motor 212 is a stepper motor.

Thus, the present invention provides a touch-sensitive rotary control 104, which can also be illuminated by an integral light source.

Figure 3:
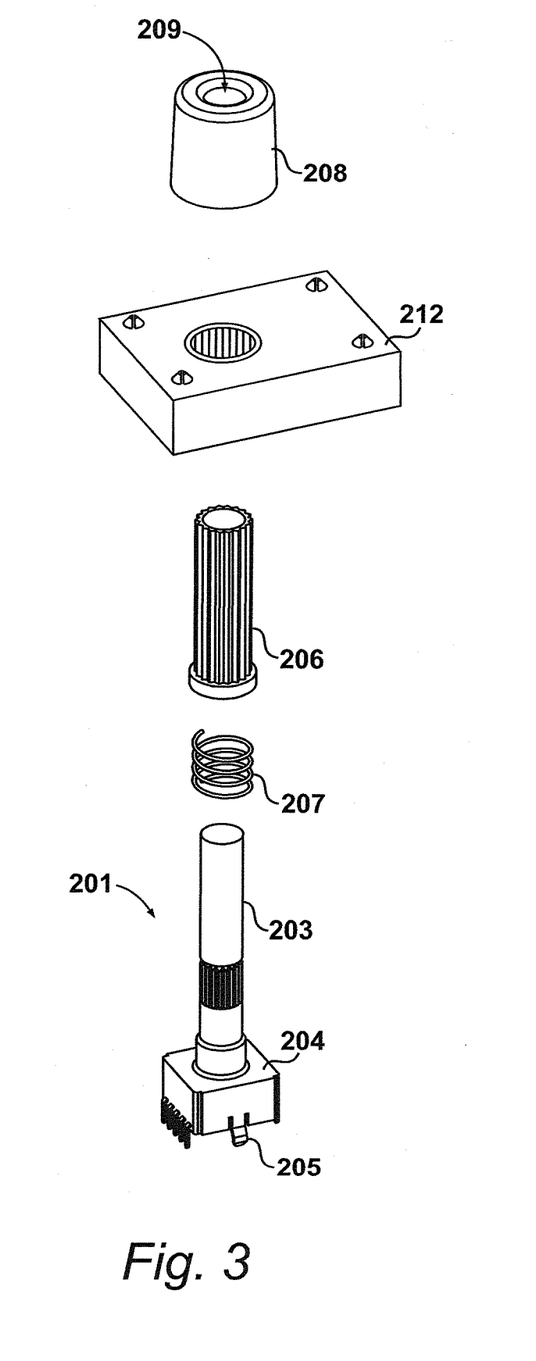
FIG. 3 is a blown-apart view of components found in the rotary control of the present invention.

FIG. 3

A blown-apart view of rotary control 104 is shown in FIG. 3, to show the individual components described with reference to FIG. 2 in their entirety. The lower PCB 202 and upper PCB 210, along with the control surface 103 and the annular lighting array 211 are omitted so that the components that are shown are more clearly in view. It is envisaged that the present invention will be provided as a kit of individual parts, as clearly assembly and mounting is required when incorporating it into an end product such as mixing console 101. Thus, the present invention provides a kit-of-parts for assembling a touch-sensitive rotary control device with an illumination function, which includes the rotary encoder 201 and conductive sleeve 206. Conductive sleeve 206 may then be fitted onto the rotatable shaft 203 of rotary encoder 201 during assembly.

As more clearly shown in FIG. 3, the conductive sleeve 206 has splined formations on its outer surface. This allows conductive knob 208 to include co-operating splines (not shown) on an inside surface to allow an operator to turn the rotary control 104, with the conductive knob 208 remaining in place by an interference fit. This presents an advantage as the knob may be replaced if necessitated by damage or wear, etc. The splines also allow drive torque from motor 212 (if included and active) to be transmitted to the conductive sleeve 206.

FIG. 4

As described previously, the motor 212 is, in a specific embodiment, a stepper motor. A cross-sectional view through rotary control 104 is shown in FIG. 4, to show the arrangement of motor 212 and conductive sleeve 206.

In the specific embodiment shown in FIG. 4, the splined formations on conductive sleeve 206 allow it to form the rotor in the stepper motor configuration. In this embodiment, four electromagnets are provided: electromagnet 401, electromagnet 402, electromagnet 403, and electromagnet 404. The electromagnets form a stator 405 which surrounds the splined conductive sleeve 206. As will be understood by those skilled in the art, various stepping modes can be provided which energize the electromagnets 401-404 in the stator 405 with different waveforms and in different orders to obtain different drive characteristics. An advantage of using a stepper motor is that it has full torque at standstill, and thus the rotary control 104 may be "locked" in place if required. In addition, this type of motor is brushless, and so when the electromagnets 401-404 are not energized there is no resistance to the rotation of the rotary control 104, and no wear will occur.

Alternative motor arrangements could also be provided depending upon the implementation. For example, the splined formations on conductive sleeve 206 could be shaped as teeth so as to mesh with a co-operating cog on the motor 212.

FIG. 5

A functional block diagram of the rotary control 104 of the present invention forming part of a control system is shown in FIG. 5.

The rotary control 104 is shown as if in operation, and is coupled to a microcontroller 501 which has a number of inputs and outputs.

As described previously, rotary control 104 includes conductive sleeve 206 mechanically coupled to rotatable shaft 203, which forms part of rotary encoder 201. Turning of the rotatable shaft 203 causes a signal to be produced by a rotary sensor circuit 502 within rotary encoder 201, the signal indicating the motion of rotatable shaft 203 in the present embodiment. In this embodiment, the rotary encoder 201 is an incremental rotary encoder and so the rotary sensor circuit 502 operates to output pulses which encode the information as to the rotation of the shaft 203. The signals produced by rotary sensor circuit 502 are received at a first input terminal 503 in microcontroller 501.

In the specific embodiment shown in FIG. 5, a momentary switch 504 is provided within rotary encoder 201 as previously described with reference to FIG. 2A. Thus, in addition to the sensing of rotation of the rotatable shaft 203 by rotary sensor circuit 502, sensing is provided for linear motion of rotatable shaft 203. The output of momentary switch 504 is received at a second input terminal 505 in microcontroller 501.

As described previously, touch sensitivity is achieved by maintaining electrical conductivity between the conductive sleeve 206 and the outer casing 204 of rotary encoder 201. A change in signal at pin 205 on rotary encoder 201 occurs when an operator grips conductive knob 208, thus allowing microcontroller 201 to sense when the rotary control 104 is being touched. In the present embodiment, conductive spring 207 is positioned between the conductive sleeve 206 and the outer casing 204 so that activation of the momentary switch 504 is possible in conjunction with continuous touch sensitivity. Changes at pin 205 are sensed at a third input terminal 506 of microcontroller 501.

By receiving a signal indicative of the rotatable shaft 203 being turned, and to what degree and how quickly, configurable control logic in microcontroller 501 is therefore able to control motor 212. Thus, in the present embodiment, a control signal can be provided to motor 212 via control terminal 507 in microcontroller 501 in response to an operator rotating the conductive knob 208.

The closed-loop control system formed by the motor 212, rotary encoder 201 and microcontroller 501 allows the rotary control 104 to simulate the feel of various kinds of traditional rotary control devices. By applying torque to the conductive sleeve 206 in a direction opposite to the direction in which conductive knob 208 is turned by an operator, various types of haptic feedback may be provided. Thus, simulation of characteristics such as constant resistance, stepped and center detents, spring-back action, etc. may be provided. In addition, the touch sensitivity of rotary control 104 means that microcontroller 501 can immediately cease drive by motor 212 when an operator lets go of conductive knob 208.

As described previously with reference to FIG. 2A, a light source 508 is provided within the outer casing 204 of rotary encoder 201. Recalling that rotatable shaft 203 is configured to act as a light guide, light source 508 allows the illumination of it and therefore the provision of light through the opening (209, FIG. 2B) in conductive knob 208. In the illustrated embodiment, the light source 508 is a light emitting diode (LED), and in a specific embodiment light source 508 is a multi-colored or RGB (red-green-blue) LED. Thus, different colors can be produced by the light source 508 in response to an appropriate control signal received via a control terminal 509 in microcontroller 501. In a specific embodiment, the color of the light source 508 is dependent upon the assigned function which the rotary control 104 controls in mixing console 101.

In addition to light source 508, the annular lighting array 211 is shown, and in the illustrated embodiment is an array of LEDs. In a similar way to light source 503, the LEDs are in the present embodiment multi-colored LEDs, where provision of appropriate control by microcontroller 501 via a control terminal 510 in microcontroller 501 allows different colors to be produced. This allows, in an example, the current position of the conductive knob 208 to be indicated on a scale.

A device I/O (input/output) interface 511 is provided in microcontroller 501 to allow it to communicate with other devices. For example, the microcontroller 501 may be coupled to a central processing unit in mixing console 101, in which parameters are controlled by rotary control 104. In response to the assignment of a function to rotary control 104, and thus a re-designation of the parameter under its control, one, some or all of the characteristics of the control may be altered. For example, the color of light source 508 may alter and the haptic feedback provided by motor 212 may change. Alternatively, features could be disabled, such as any input from momentary switch 504 being ignored.

What we claim is:

1. A touch-sensitive rotary control device with an illumination function, the control device comprising:
    a rotary encoder having a conductive outer casing and a rotatable shaft extending therefrom defining an axis of rotation, which shaft is configured to operate as a light guide for a light source located in the rotary encoder; and
    a conductive sleeve mechanically coupled to and arranged to surround a side of the shaft, and electrically coupled to the conductive outer casing of the rotary encoder, to provide touch-sensitivity whilst allowing light to exit the shaft,
    the rotary encoder including a switch manipulated by movement of the shaft in a direction parallel to its axis of rotation, and
    the control device further comprises a conductive spring positioned between the conductive sleeve and the outer casing of the rotary encoder to maintain electrical conductance therebetween.

2. The rotary control device of claim 1, in which the switch is a momentary switch.

3. The rotary control device of claim 1, further comprising a conductive grip member mechanically and electrically coupled to the sleeve, the grip member having a through hole into which the shaft extends so as to allow light from the light source to exit the control device.

4. The rotary control device of claim 1, further comprising a motor coupled to the conductive sleeve.

5. The rotary control device of claim 4, further comprising a conductive grip member mechanically and electrically coupled to the sleeve and wherein the motor is arranged to provide torque in a direction opposite to the direction in which an operative turns the grip member to provide haptic feedback.

6. The rotary control device of claim 1, in which the light source is a multi-colored light emitting diode.

7. The rotary control device of claim 3, further comprising an annular lighting array arranged to be viewable around the grip member.

8. The rotary control device of claim 7, in which the annular lighting array comprises a plurality of individual multi-colored light emitting diodes.

9. A touch-sensitive rotary control device with an illumination function, the control device comprising:
a rotary encoder having a conductive outer casing and a rotatable shaft extending therefrom defining an axis of rotation, which shaft is configured to operate as a light guide for a light source located in the rotary encoder;
a conductive sleeve mechanically coupled to and arranged to surround a side of the shaft, and electrically coupled to the conductive outer casing of the rotary encoder, to provide touch-sensitivity whilst allowing light to exit the shaft; and
a motor coupled to the conductive sleeve;
the motor being a stepper motor, and including a stator surrounding the conductive sleeve, and
the conductive sleeve including splined formations thereon to act as a rotor of the stepper motor.

10. The rotary control device of claim 9, further comprising a conductive grip member mechanically and electrically coupled to the sleeve, the grip member having a through hole into which the shaft extends so as to allow light from the light source to exit the control device.

11. The rotary control device of claim 9, further comprising a conductive grip member mechanically and electrically coupled to the sleeve and wherein the motor is arranged to provide torque in a direction opposite to the direction in which an operative turns the grip member to provide haptic feedback.

12. The rotary control device of claim 9, in which the light source is a multi-colored light emitting diode.

13. The rotary control device of claim 10, further comprising an annular lighting array arranged to be viewable around the grip member.

14. The rotary control device of claim 13, in which the annular lighting array comprises a plurality of individual multi-colored light emitting diodes.

15. A kit of parts for assembling a touch-sensitive rotary control device with an illumination function, comprising:
a rotary encoder having a conductive outer casing and a rotatable shaft extending therefrom defining an axis of rotation, which shaft is configured to operate as a light guide for a light source located in the rotary encoder; and
a conductive sleeve arranged to mechanically couple to and to surround a side of the shaft, and arranged to electrically couple to the conductive outer casing of the rotary encoder, to provide touch-sensitivity whilst allowing light to exit the shaft,
the rotary encoder including a switch manipulated by movement of the shaft in a direction parallel to its axis of rotation, and
the kit further comprising a conductive spring for positioning between the conductive sleeve and the outer casing of the rotary encoder to maintain electrical conductance between the conductive sleeve and the outer casing.

16. The kit of parts of claim 15, further comprising a conductive grip member arranged to mechanically and electrically couple to the sleeve, the grip member having a through hole into which the shaft will extend so as to allow light from the light source to exit the control device.

17. The kit of parts of claim 15, further comprising a motor for coupling to the conductive sleeve to apply torque thereto.

18. A kit of parts for assembling a touch-sensitive rotary control device with an illumination function, comprising:
a rotary encoder having a conductive outer casing and a rotatable shaft extending therefrom defining an axis of rotation, which shaft is configured to operate as a light guide for a light source located in the rotary encoder;
a conductive sleeve arranged to mechanically couple to and to surround a side of the shaft, and arranged to electrically couple to the conductive outer casing of the rotary encoder, to provide touch-sensitivity whilst allowing light to exit the shaft; and
a motor for coupling to the conductive sleeve to apply torque thereto,
the motor being a stepper motor, and including a stator arranged to surround the conductive sleeve, and
the conductive sleeve including splined formations thereon to act as a rotor of the stepper motor.

19. The kit of parts of claim 18, further comprising a conductive grip member arranged to mechanically and electrically couple to the sleeve, the grip member having a through hole into which the shaft will extend so as to allow light from the light source to exit the control device.

20. A mixing console having a control surface including at least one touch-sensitive rotary control device with an illumination function mounted thereon to which control of a plurality of functions can be assigned, the control device comprising:
a rotary encoder having a conductive outer casing positioned behind the control surface, and a rotatable shaft extending from the rotary encoder through an opening in the control surface and defining an axis of rotation, which shaft is configured to operate as a light guide for a light source located in the rotary encoder; and
a conductive sleeve mechanically coupled to and arranged to surround a side of the shaft, and electrically coupled to the conductive outer casing of the rotary encoder, to provide touch-sensitivity whilst allowing light to exit the shaft,
the rotary encoder including a switch manipulatable by movement of the shaft in a direction parallel to its axis of rotation, and
the control device further comprising a conductive spring positioned between the conductive sleeve and the outer casing of the rotary encoder to maintain electrical conductance between the conductive sleeve and the outer casing.

21. The mixing console of claim 20, in which the light source is a multi-colored light emitting diode whose color is dependent upon the assigned function for the control device.

22. The mixing console of claim 20, further comprising a conductive grip member arranged to mechanically and electrically couple to the sleeve, the grip member having a through hole into which the shaft will extend so as to allow light from the light source to exit the control device.

23. The mixing console of claim 22, further comprising an annular lighting array arranged to be viewable around the grip member.

\* \* \* \* \*